(12) United States Patent
Hoar

(10) Patent No.: US 6,768,751 B2
(45) Date of Patent: Jul. 27, 2004

(54) METHODS AND APPARATUS FOR REMOVING HEAT FROM A LASING MEDIUM OF A SOLID-STATE LASER ASSEMBLY

(75) Inventor: Roy M. Hoar, Canoga Park, CA (US)

(73) Assignee: The Boeing Company, Chicago, IL (US)

( * ) Notice: Subject to any disclaimer, the term of this patent is extended or adjusted under 35 U.S.C. 154(b) by 51 days.

(21) Appl. No.: 10/172,878

(22) Filed: Jun. 17, 2002

(65) Prior Publication Data
US 2003/0231668 A1 Dec. 18, 2003

(51) Int. Cl.[7] .............................................. H01S 3/042
(52) U.S. Cl. .............................. 372/35; 372/71; 372/72
(58) Field of Search ................................ 372/35, 71, 72

(56) References Cited

U.S. PATENT DOCUMENTS

| | | |
|---|---|---|
| 4,791,634 A | 12/1988 | Miyake |
| 5,253,260 A | 10/1993 | Palombo |
| 5,504,764 A | 4/1996 | Pohlmann et al. |
| 6,058,711 A | 5/2000 | Maciaszek et al. |
| 6,241,008 B1 | 6/2001 | Dunbar |
| 6,330,259 B1 * | 12/2001 | Dahm ........................ 372/35 |

* cited by examiner

Primary Examiner—James W. Davie
(74) Attorney, Agent, or Firm—Harness Dickey & Pierce P.L.C.

(57) ABSTRACT

An apparatus for removing heat from a lasing medium of a solid-state laser assembly is provided that comprises a working fluid and at least one condensation surface defined by a housing in which at least a portion of the lasing medium is housed. The apparatus further comprises a coolant circuit and a wick disposed to distribute the working fluid in a liquid state over at least a portion of an outer surface of the lasing medium and to capture working fluid condensing upon the at least one condensation surface. During use, the wick distributes the working fluid in a liquid state over the at least a portion of the outer surface of the lasing medium. During contact with the at least a portion of the outer surface of the lasing medium, the working fluid evaporates and removes heat from the lasing medium. The working fluid in a vapor state contacts the at least one condensation surface, transfers heat to the at least one condensation surface, and condenses on the at least one condensation surface. The wick captures and returns the condensing working fluid substantially by capillary action to the lasing medium for redistribution over the at least a portion of the outer surface of the lasing medium. Lastly, heat is transferred to the coolant circuit from the at least one condensation surface.

21 Claims, 4 Drawing Sheets

METHODS AND APPARATUS FOR REMOVING HEAT FROM A LASING MEDIUM OF A SOLID-STATE LASER ASSEMBLY

FIELD OF THE INVENTION

The present invention relates generally to solid-state lasers and more particularly to devices and methods for removing heat from a lasing medium of a solid-state laser assembly.

BACKGROUND OF THE INVENTION

Many different types of solid-state lasers exist and are being used in both military and industrial applications around the world for various purposes. For example, solid-state lasers are used by the military as rangefinders to determine target distance. Solid-state lasers are also used as industrial laser welders and cutters.

Generally, a solid-state laser is a laser that uses an optical pumping source to invert population in a solid medium, which then lases via stimulated emissions. The optical pumping source may apply optical pump energy to the lasing medium so as to irradiate the lasing medium and effect a laser beam. Stated differently, the pump means provides photons that enter the lasing medium at a given wavelength A but exit from the lasing medium at a wavelength B.

There are many different lasing mediums which may be used in a solid-state laser. Indeed, lasing mediums are available in a wide variety of shapes, sizes and materials. For example, a doped YAG (yttrium-aluminum-garnet) rod may be used as the lasing host medium in the solid-state laser. YAG ($Y_3Al_5O_{12}$) is a synthetic garnet of yttrium and aluminum oxide that is commonly used to generate laser beams in solid-state laser assemblies. The YAG crystal may be doped with neodymium (Nd), ytterbium (Yb), holmium (Ho), erbium (Er), thulium (Tm) ions, among others.

While solid-state lasers of the type described above work well and are currently being used, inefficiencies in the wavelength conversion process generate waste heat. When the lasing medium is irradiated, waste heat is generated along with the laser beam. If the waste heat is not removed, temperature gradients may build-up in the lasing medium as well as stresses and strains. In addition, the removal of the waste heat is also desirable because removing the waste heat from the lasing medium tends to improve wavelength conversion efficiency thereby resulting in improved performance of the solid-state laser.

One method currently being used to remove waste heat from lasing mediums comprises the use of streaming or flowing water over the surface of the lasing medium. Although this method will remove waste heat from a lasing medium, it does have some rather significant limitations and problems associated therewith. For example, if a large quantity of heat is to be removed from a lasing medium, a correspondingly large volume of water at a relatively high velocity must flow over the surface of the lasing medium. However, the high-volume/high-velocity flow of water over the surface of the lasing medium causes flow-induced vibrations in the lasing medium, which in turn reduce the conversion efficiency of the lasing medium. Moreover, turbulence in the high-volume/high-velocity flow of water also causes non-uniformity in the heat removal from the surface of the lasing medium, which further reduces the conversion efficiency of the lasing medium. In addition, the inlet water temperature must also be closely controlled to within +/−2 degrees Fahrenheit, thus making temperature control of the external coolant circuit critical. Finally, although other housing components (e.g., end-walls, seal glands) may also be cooled by flowing water over them, doing so only increases the pressure drop in the cooling system and is a source of system inefficiency.

SUMMARY OF THE INVENTION

Accordingly, a need remains in the art for a device and method that is capable of removing waste heat from a lasing medium while not otherwise affecting the conversion efficiency of the lasing medium. Ideally, the device and method would remove the waste heat substantially uniformly from the lasing medium without inducing vibration or motion in the lasing medium.

In one form, the present invention provides an apparatus for removing heat from a lasing medium of a solid-state laser assembly. The apparatus comprises a working fluid and at least one condensation surface defined by a housing in which at least a portion of the lasing medium is housed. The apparatus further comprises a coolant circuit and a wick disposed to distribute the working fluid in a liquid state over at least a designated portion of an outer surface of the lasing medium and to capture working fluid condensing upon the condensation surface. During use, the wick distributes the working fluid in a liquid state over the designated portion of the outer surface of the lasing medium. During contact with the designated portion of the outer surface of the lasing medium, the working fluid evaporates and removes heat from the lasing medium. The working fluid in a vapor state contacts the condensation surface, transfers heat to the condensation surface and condenses on the condensation surface. The wick captures and returns the condensing working fluid substantially by capillary action to the lasing medium for redistribution over the designated portion of the outer surface of the lasing medium. Lastly, heat is transferred to the coolant circuit from the condensation surface.

The present invention also provides methods for removing heat from a lasing medium of a solid-state laser assembly. In one embodiment, the method comprises the steps of: using a wick to distribute a working fluid in a liquid state over at least a designated portion of an outer surface of the lasing medium, the working fluid evaporating and removing heat from the lasing medium during contact with the designated portion of the outer surface of the lasing medium, the working fluid in a vapor state contacting at least one condensation surface, the working fluid transferring heat to the condensation surface and condensing on the condensation surface; using a coolant circuit to remove heat from the condensation surface; and using the wick to capture and return the condensing working fluid to the lasing medium for redistribution over the at least a portion of the outer surface of the lasing medium.

In yet another form, the present invention provides methods for controlling the operating temperature of a lasing medium of a solid-state laser assembly. In one embodiment, the method comprises the steps of: selecting a working fluid; selecting an operating pressure for the working fluid; distributing the working fluid in a liquid state at the operating pressure substantially uniformly over at least a designated portion of an outer surface of the lasing medium, the working fluid evaporating and removing heat from the lasing medium during contact with the at least a portion of the outer surface of the lasing medium surface, the working fluid in a vapor state contacting at least one condensation surface, the working fluid transferring heat to the condensation surface and condensing on the condensation surface; removing heat from the condensation surface; and capturing and returning the condensing working fluid to the lasing medium for redistribution over the designated portion of the outer surface of the lasing medium. Accordingly, the temperature of the designated portion of the outer surface of the lasing medium is substantially equal to the boiling temperature of the working fluid at the operating pressure.

Preferably, the method of controlling the operating temperature of the lasing medium further comprises the steps of: determining the optimum operating temperature for the lasing medium; and using the optimum operating temperature for the lasing medium to select the working fluid and the operating pressure for the working fluid so that the working fluid at the operating pressure has a boiling temperature substantially equal to the optimum operating temperature for the lasing medium. Accordingly, the temperature of the designated portion of the outer surface of the lasing medium is chosen to maintain the optimum operating temperature of the lasing medium.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. For example, a solid-state laser assembly as used herein shall be construed by those skilled in the art to be any of a wide range of apparatus that use a lasing medium to generate a laser regardless of whether the apparatus is operated manually, automated, or in a combination thereof and regardless of whether the energy used to stimulate the emission from the lasing medium is optically or electrically pumped. Accordingly, the specific references to solid-state laser assembly or solid-state laser herein should not be construed as limiting the scope of the present invention. The present invention should also not be limited to components specific to solid-state laser assembly, wherein other components may be employed such as one or more components of a semiconductor laser assembly or diode laser assembly, among others.

In addition, certain terminology will also be used in the following description for the purpose of reference only, and thus are not intended to be limiting. For example, terms such as "upper", "lower", "above", and "below" refer to directions in the drawings to which reference is made. Terms such as "front", "back", "rear", and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

Figure 1:
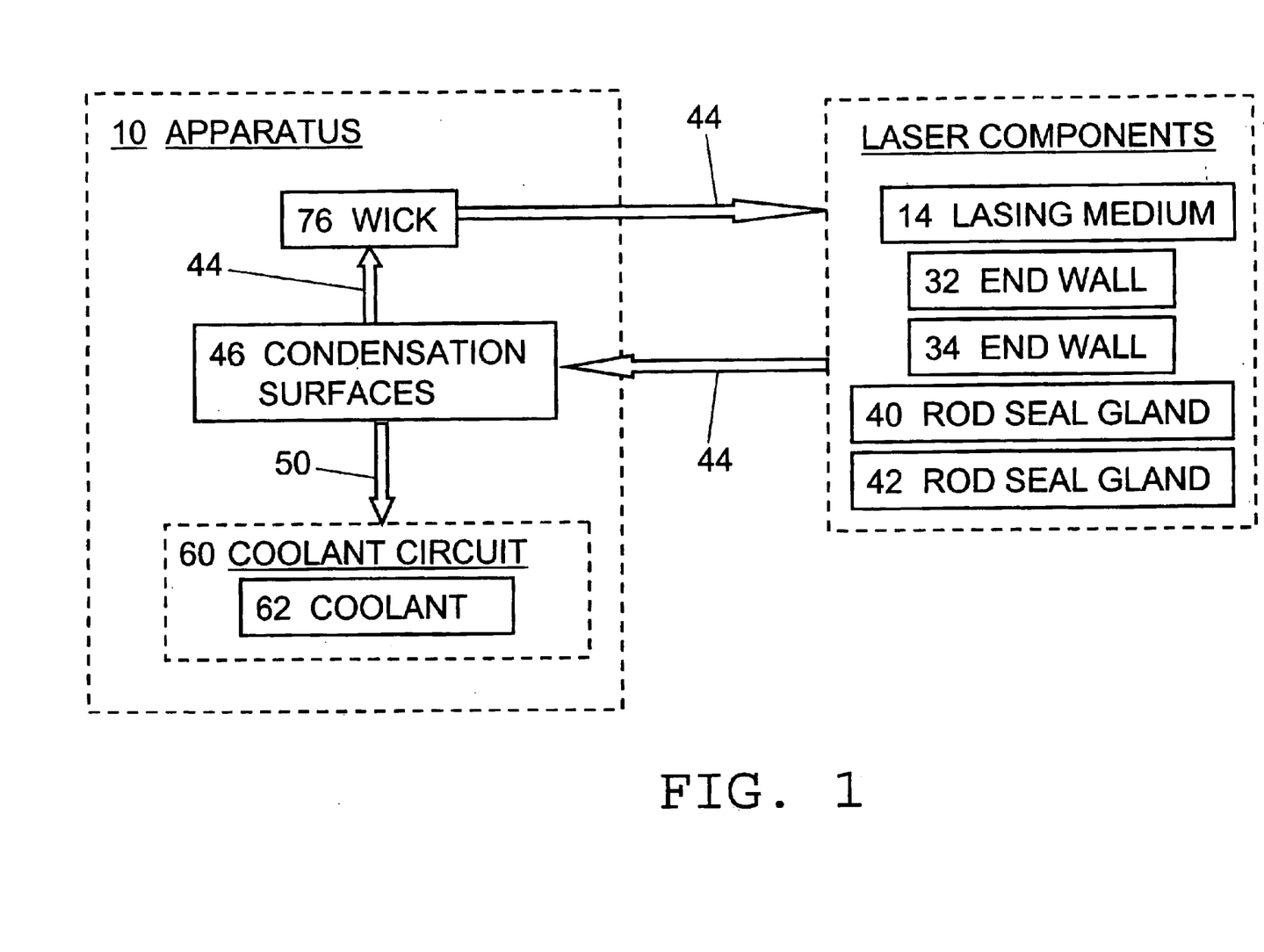
FIG. 1 is a block diagram representation of the components of an apparatus for removing heat from a lasing medium in accordance with the principles of the present invention.

Referring to the drawings, an apparatus for removing heat from a lasing medium according to the present invention is generally indicated by reference numeral 10 in FIG. 1. The apparatus 10 is generally operable with a solid-state laser assembly, such as the solid-state laser assembly generally indicated by reference numeral 12 in FIG. 2. The solid-state laser assembly 12 in which the apparatus 10 may be used may comprise any of a wide range of solid-state laser assemblies now known in the art or that may be developed in the future. Even though solid-state laser assemblies are well-known in the art, however, a brief description of the solid-state laser assembly 12 will be given in order to provide a more understandable basis for understanding the present invention.

Figure 2:
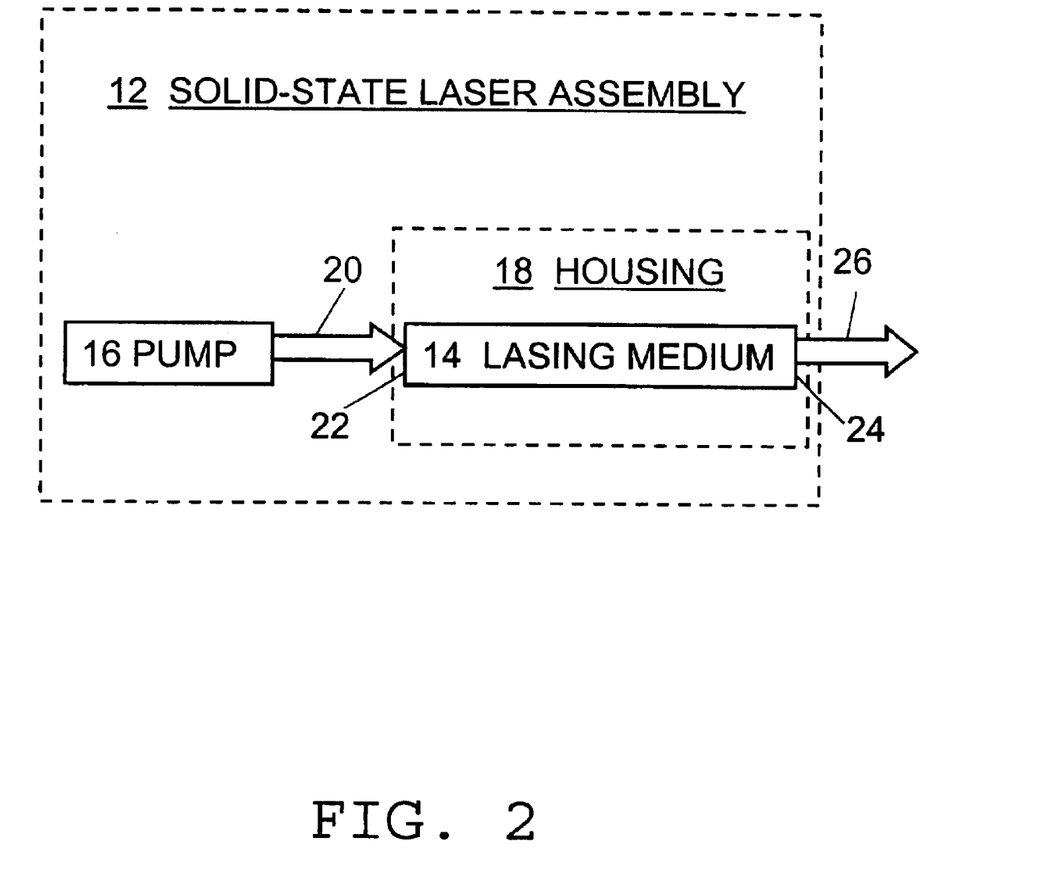
FIG. 2 is a block diagram representation of the components of a solid-state laser assembly in which the apparatus shown in FIG. 1 may be used.

As shown in FIG. 2, the solid-state laser assembly 12 in which the apparatus 10 is used comprises a lasing medium 14, a pump 16, and a housing 18 in which at least a portion of the lasing medium 14 is housed. Generally, the apparatus 10 removes heat from the lasing medium 14 and optionally from one or more components of the housing 18.

In the illustrated embodiment, the lasing medium 14 comprises a ytterbium (Yb) doped YAG (yttrium-aluminum-garnet which is $Y_3Al_5O_{12}$) rod. It should be noted, however, that the particular shape, material, and size for the lasing medium 14 are shown and described herein for illustrative purposes only. In other embodiments, the present invention may be used with lasing mediums that are not rod-shaped but instead are, for example, slabs. Or for example, the present invention may be used in conjunction with any of a wide range of other suitable lasing mediums comprising materials such as synthetic ruby crystals (Chromium doped aluminum oxide ($Cr:Al_2O_3$)), neodymium doped materials such as Nd:YAG, $Nd:YVO_4$ (Neodymium-doped Yttrium orthoVanadate), Nd:Glass, Nd:YLF (Neodymium doped Yttrium Lithium Fluoride), among others. In short, the present invention should not be regarded as limited to use with the particular lasing medium 14 shown and described herein.

The pump 16 is used to stimulate laser emissions from the lasing medium 14. As shown in FIG. 2, the pump 16 provides optical energy 20 (e.g., photons of given wavelength A) to an end 22 of the lasing medium 14, and the other end 24 of the lasing medium 14 emits a laser beam 26 having a wavelength B.

Figure 3:
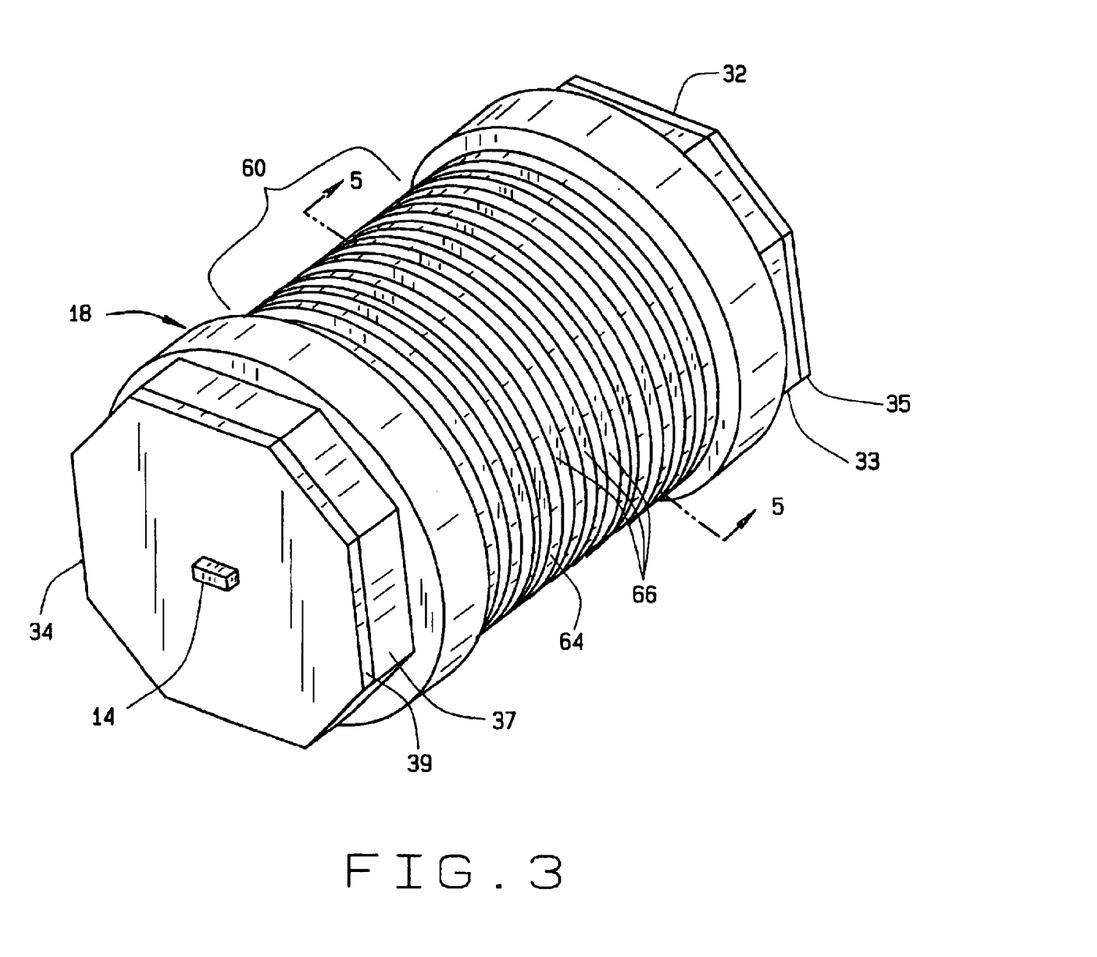
FIG. 3 is a perspective view of a laser rod housing in which the apparatus shown in FIG. 1 may be used.
Figure 4:
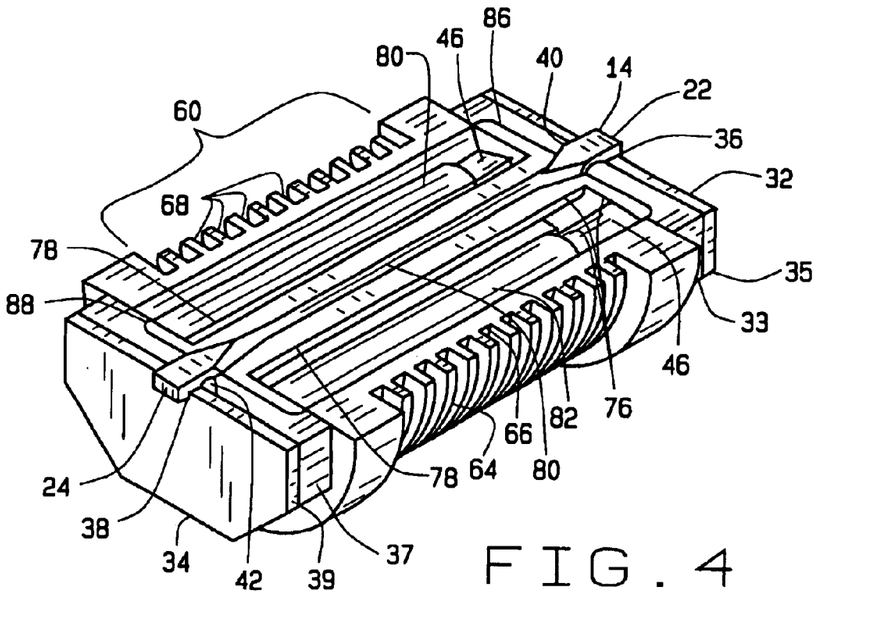
FIG. 4 is cutaway perspective view of the laser rod housing shown in FIG. 3 with its top portion removed to show the components of the apparatus shown in FIG. 1 according to one embodiment of the present invention.

Referring now to FIGS. 3 and 4, the housing 18 in which at least a portion of the lasing medium 14 is housed comprises two opposed end walls 32 and 34. In the illustrated embodiment, the end wall 32 comprises a seal plate 33 and a seal compression plate 35. An opening or aperture 36, sized to receive the end 22 of the lasing medium 14, extends through the seal plate 33 and the seal compression plate 35. Similarly, the end wall 34 comprises a seal plate 37 and a seal compression plate 39. An opening or aperture 38, sized to receive the other end 24 of the lasing medium 14, extends through the seal plate 37 and the seal compression plate 39. By engaging the respective ends 22 and 24 of the lasing medium 14 with the openings 36 and 38, the lasing medium 14 may be mounted within the housing 18. Seal glands 40 and 42 may also be used so as to create or provide a fluid-tight seal between the lasing medium ends 22 and 24 and the respective end walls 32 and 34. Once the lasing medium 14 is mounted within the housing 18, the respective lasing medium ends 22 and 24 may either extend outwardly from the respectively seal compression plates 35 and 39. Alternatively, the ends 22 and 24 of the lasing medium 14 may instead be flush with the respectively seal compression plates 35 and 39 or recessed within the housing 18.

The opening 36 provided in the end wall 32 also allows the pump 16 to provide the optical energy 20 to the end 22 of the lasing medium 14. The opening 38 provided in the end wall 34 allows the laser beam 26 emitted from the other end 24 of the lasing medium 14 to exit the housing 18.

The above description of the solid-state laser assembly 12 has been provided for illustrative purposes only. Consequently, the present invention should not be regarded as limited to the particular solid-state laser assembly 12 shown and described herein.

Regardless of the particular solid-state laser assembly 12 in which the heat removal apparatus 10 is used, the apparatus 10 comprises a working fluid 44 that is preferably provided or added into the housing 18 before the housing 18 is sealed. As will be described later, the working fluid 44 is generally used to remove heat from the lasing medium 14 and optionally from the housing end walls 32, 34 and seal glands 40, 42.

The working fluid 44 may be selected from any of a wide range of suitable fluids including, but not limited to, water, acetone, methanol, ethanol, Freon, heptane, among others. The selection of which particular working fluid 44 to use may depend at least in part on the particular laser assembly in which the apparatus 10 will be used. When selecting the working fluid 44, it is preferable to select a working fluid 44 that has a boiling temperature, at or near atmospheric pressure, that is substantially equal to the optimum operating temperature for the lasing medium 14. By having the operating pressure at or near the atmospheric pressure, there is less of a chance that the seal glands 40 and 42 will leak and thus cause either a loss or contamination of the working fluid 44. The working fluid 44 should also be compatible with the housing 18 and the various components contained therein, including the later-described components of the apparatus 10.

In addition, because several fluids may have over-lapping operating temperature ranges, a merit or reference number may used to relatively compare the heat removal capabilities for various fluids at a given operating temperature and pressure. For example, a merit number for a working fluid may be calculated as follows:

$$M = (\sigma L \rho)/\mu$$

wherein $\sigma$ is the liquid surface tension for the working fluid, L is the latent heat for the working fluid, $\rho$ is the liquid density of the working fluid, and $\mu$ is the liquid viscosity for the working fluid. After computing the merit numbers for each of the working fluids under consideration, the working fluid having the highest merit number may then be selected.

The apparatus 10 further comprises at least one condensation surface 46 disposed within the housing 18. The condensation surface 46 may be defined by or be integral with the housing 18. In other words, the condensation surface 46 may comprise a surface defined by a wall or side of the housing 18. Alternatively, the condensation surface 46 may be defined by one or more separate components that are mounted within the housing 18. In addition, it should be noted that any suitable number of suitably shaped and sized condensation surfaces may be variously arranged (e.g., longitudinally, circumferentially, or in a combination thereof) within the housing 18 depending upon the particular requirements of the application in which the apparatus 10 will be used.

Figure 5:
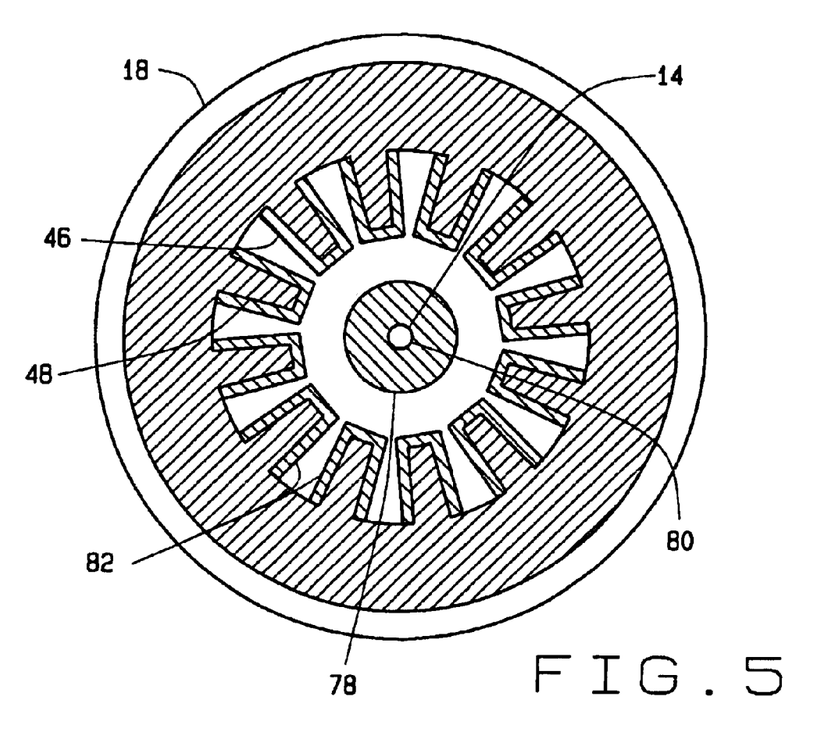
FIG. 5 is a cross-sectional end view of the laser rod housing shown in FIG. 3 taken along the plane 5—5 in FIG. 3.

In the illustrated embodiment shown in FIG. 5, the housing 18 defines a plurality of condensation surfaces 46. More specifically, the housing 18 comprises a plurality of inwardly extending fins or plates 48, respectively, that define a plurality of condensation surfaces 46. It should be noted that although the fins 48 are shown disposed longitudinally within the housing 18, such need not be the case. Alternatively, the fins 48 may be disposed circumferentially around the housing 18.

Any of a wide range of thermal-conducting materials may be used for the condensation surfaces 46. However, it is generally preferred that the condensation surfaces 46, or more specifically the one or more components defining the condensation surfaces 46, comprise a material having a relatively high thermal conductivity so as to enhance the total heat removal capabilities of the apparatus 10.

Referring back to FIGS. 1, 3 and 4, the apparatus 10 further comprises a coolant circuit or loop 60 to remove heat 50 from the condensation surfaces 46. The coolant circuit 60 has a fluid or coolant 62 disposed therein such that heat 50 may be transferred from the condensation surfaces 46 to the coolant 62 as the coolant 62 is circulating over an outer surface 64 of the housing 18. To enhance the effective heat transfer rate from the condensation surfaces 46 to the coolant 62, the outer surface 64 of the housing 18 may comprise a plurality of grooves or channels 66 defining extended surfaces 68 (e.g., fins). The extended surfaces 68 increase the amount of surface area and thus the heat transfer rate between the coolant 62 and the outer surface 64 of the housing 18, which in turn should allow for the use of a lower rate of flow of the coolant 62 through the coolant circuit 60.

The coolant 62 may comprise any of a wide range of fluids, such as water, oil, air, among others, that are suitable for the intended application. However, it should be noted that the coolant 62 should not erode the outer surface 64 of the housing 18. The coolant 62 must also be cooler than the temperature at which the working fluid 44 condenses at the operating pressure.

As shown in FIG. 4, the apparatus 10 further comprises a wick 76. The wick 76 has at least a first portion 78 that is disposed adjacent the lasing medium 14. The first wick portion 78 may be substantially tubular (as indicated in FIG. 5) and may be disposed substantially around the portion of the lasing medium 14 between the seal plates 33 and 37. Stated differently, the first wick portion 78 is disposed substantially around an outer surface 80 of the lasing medium 14, wherein the outer surface 80 is defined between the seal plates 33 and 37.

When the wick 76 is wetted or provided with a working fluid in liquid form 44 (as indicated in FIG. 1), the first wick portion 78 distributes a portion of the liquid working fluid 44 over the outer or lasing medium surface 80, or at least a portion thereof. During contact with the lasing medium surface 80, the working fluids 44 evaporates (assuming that the temperature of the lasing medium surface 80 is equal to or exceeds the boiling temperature of the working fluid 44 at the operating pressure) and removes heat from the lasing medium surface 80 substantially equal to the latent heat of vaporization for the working fluid 44.

Preferably, the liquid working fluid 44 is distributed substantially uniformly over the lasing medium surface 80 by the first wick portion 78, which as described later, results in substantially uniform heat removal from the lasing medium surface 80. In addition, the transfer of heat from the lasing medium 14 is nearly isothermal because heat should not be removed by the apparatus 10 from the lasing medium 14 until the lasing medium surface 80 reaches the boiling temperature of the working fluid 44. Accordingly, the evaporation process should occur at substantially the same temperature (i.e., the boiling temperature of the working fluid 44 at the operating pressure) along the entirety of the lasing medium surface 80, which thus allows the lasing medium surface 80 to be maintained at a substantially uniform temperature. Indeed, the lasing medium surface 80 is preferably maintained at its optimum operating temperature by selecting the appropriate working fluid 44 and operating pressure. Indeed, the lasing medium surface 80 is preferably maintained at a temperature that in turn maintains the lasing medium 14 at its optimum operating temperature by selecting the appropriate working fluid 44 and operating pressure.

With brief reference to FIG. 5, the wick 76 further comprises at least a second portion 82 disposed adjacent the condensation surfaces 46, respectively. The second wick portion 82 captures or entrains the liquid working fluid 44 condensing on the condensation surfaces 46. With the liquid working fluid 44 being captured by the second wick portion 82 instead of "pooling" at the bottom of the housing 18, the liquid working fluid 44 may now be transported and delivered by the wick 76 to the outer surface 80 of the lasing medium 14, in the manner previously described.

Optionally, the present invention may also be used to remove heat from at least one component of the housing 18. In the illustrated embodiment, the apparatus 10 also removes heat from the end walls 32, 34 and the seal glands 40, 42. The end wall 32 and seal gland 40 may, for example, have had heat transferred thereto as a result of the optical energy 20 from the pump 16 being partially directed or focus on the outer surface of the end wall 32. In the illustrated embodiment, the wick 76 comprises third and fourth wick portions 86 and 88 disposed adjacent the end walls 32 and 34, respectively. The third wick portion 86 distributes the liquid working fluid 44 to the end wall 32, whereas the fourth wick portion 88 distributes the liquid working fluid 44 to the end wall 34. During contact with the end walls 32 and 34, the liquid working fluid 44 evaporates (assuming that the temperature of the end walls 32 and 34 is equal to or exceeds the boiling temperature of the working fluid 44 at the operating pressure) and removes heat from the end walls 32 and 34 substantially equal to the latent heat of vaporization for the working fluid 44. In addition, the distribution of the liquid working fluid 44 by the third and fourth wick portions 86 and 88 also allows for heat to be removed from the seal glands 40 and 42 in a like manner.

The wick 76 may comprise any of a wide range of suitable liquid-absorbent or porous materials, including both metals and nonmetals. The wick 76, however, must be capable of being wetted by the working fluid 44 and not react to the working fluid 44. By way of example only, the wick 76 may comprise a wire mesh optimized to transport either water or methanol. It should be noted, however, that different working fluids may require different wicks having various pore sizes, wire sizes, materials (e.g., Fiberglass, sintered metal, porous material, etc.), among others. In other words, the optimal configuration (e.g., material, size, pore size, shape, etc.) of the wick 76 will likely depend at least in part on what working fluid 44 is being used with the apparatus 10.

In addition, the wick 76 is preferably designed to deliver the working fluid 44 to the lasing medium surface 80 without the assistance of gravity, ensuring that the lasing medium 14 can be cooled in any orientation with little to no degradation in performance. The wick 76 is also preferably designed to ensure a constant flow of the liquid working fluid 44 to the lasing medium surface 80.

Moreover, the wick 76 itself may also remove waste heat from the housing 18. For example, the wick 76 may absorb heat directly from the light or photons existing within the housing 18. If the wick 76 absorbs enough heat, the temperature of the wick 76 may eventually exceed the boiling temperature of the liquid working fluid 44 entrained in the wick 76. At that point, the working fluid 44 may evaporate and remove heat from the wick 76 substantially equal to the latent heat of vaporization for the working fluid 44. The vaporized working fluid 44 now contains the transferred heat from the housing 18. This heat may then be removed from the housing 18 by way of the condensation surfaces 46 and the coolant circuit 60 in the manner previously described.

During one exemplary operational sequence, the apparatus 10 operates as follows to remove heat from the lasing medium 14, end walls 32 and 34, and seal glands 40 and 42. Assuming that the wick 76 has been appropriately wetted (i.e., provided with the liquid working fluid 44), the first wick portion 78 distributes the liquid working fluid 44 substantially uniformly over the lasing medium surface 80. As the working fluid 44 contacts the lasing medium surface 80, the working fluid 44 evaporates (assuming that the operating temperature of the lasing medium surface 80 equals or exceeds the boiling temperature of the working fluid 44 at the operating pressure) and removes heat from the lasing medium surface 80 substantially equal to the latent heat of vaporization for the working fluid 44.

Optionally, the third and fourth wick portions 86 and 88 may distribute the liquid working fluid 44 to the end walls 32 and 34, or more specifically the seal plates 33 and 37, and the seal glands 40 and 42. During contact with the end walls 32 and 34 and seal glands 40 and 42, the working fluid 44 evaporates (assuming that the operating temperature of end walls 32 and 34 and seal glands 40 and 42 equals or exceeds the boiling temperature of the working fluid 44 at the operating pressure) and removes heat from the end walls 32, 34 and the seal glands 40, 42 substantially equal to the latent heat of vaporization for the working fluid 44.

Eventually, the vaporized working fluid 44 may fill substantially the entirety of the interior housing. The resulting pressure change due to the vaporization of the working fluid 44 causes the vaporized working fluid 44 to migrate to the condensation surfaces 46. During contact with the cooler condensation surfaces 46, the vaporized working fluid 44 condenses and transfers heat to the condensation surfaces 46 substantially equal to the latent heat of the working fluid 44. Heat is then transferred from the condensation surfaces 46 to the coolant 62 circulating over the outer surface 64 of the housing 18 through the coolant circuit 60.

After condensing on the condensation surfaces 46, the liquid working fluid 44 is captured by or entrained within the second wick portion. Then, through capillary action, the wick 76 transports the liquid working fluid 44 back to the lasing medium surface 80 and optionally to the end walls 32 and 34 and seal glands 40 and 42, where the process is repeated.

It should be noted that the overall effectiveness of the apparatus 10 may be affected or impacted by the entrainment limit of the wick 76. Specifically, the vaporized working fluid 44 may pull a portion (e.g., droplets) of the working fluid 44 from the wick 76, thereby reducing the amount of liquid working fluid 44 available for redistribution at the lasing medium surface 80. The impact that the wick entrainment limit has on the operability of the apparatus 10, however, may be mitigated by decreasing the mesh or pore size of the wick 76, increasing the surface tension of the liquid working fluid 44, and/or decreasing the size of the lasing medium surface 80.

In addition, the effectiveness of the apparatus 10 may also be affected by the formation of vapor bubbles in the wick 76, which may obstruct the flow or circulation of the liquid working fluid 44 through the wick 76. Such obstructions may hinder the wick's 76 ability to distribute the liquid working fluid 44 substantially uniformly over the lasing medium surface 80, which may lead to localized hot spots and thermal stresses in the lasing medium 14. By selecting a working fluid 44 that has a relatively high thermal conductivity and/or by selecting a wick 76 that has a relatively low thermal conductivity, the likelihood of vapor bubbles forming in the wick 76 and possible problems associated therewith is reduced.

The capillary limit is another factor that may reduce the effectiveness of the apparatus 10. Specifically, evaporator burnout may occur if the working fluid 44 does not move rapidly enough through the wick 76. The capillary limit, however, may be enhanced by selection of a working fluid that has a relatively high merit number, use of shorter lasing mediums, and/or use of a wick 76 having a larger cross-sectional area, larger sized pores, and wires with larger diameters.

In another form, the present invention provides a method for removing heat from the lasing medium 14. The method comprises the steps of: using the wick 76 to distribute the liquid working fluid 44 over the lasing medium surface 80, the working fluid 44 evaporating and removing heat from the lasing medium 14 during contact with the lasing medium surface 80, the vaporized working fluid 44 contacting the condensation surfaces 46, the working fluid 44 transferring heat to the condensation surfaces 46 and condensing on the condensation surfaces 46; using the coolant circuit 60 to remove heat 50 from the condensation surfaces 46; using the wick 76 to capture the condensing working fluid 44; and using the wick 76 to return the liquid working fluid 44 to the lasing medium 14 for redistribution over the lasing medium surface 80.

Optionally, the method for removing heat from the lasing medium 14 may further comprise removing heat from at least one component of the housing 18. More specifically, the method may comprise using the wick 76 to distribute the liquid working fluid 44 to the end walls 32 and 34 and to the seal glands 40 and 42, the working fluid 44 evaporating and removing heat from the end walls 32 and 34 and the seal glands 40 and 42 upon contact with the end walls 32 and 34 and the seal glands 40 and 42.

Yet another form of the present invention comprises a method of controlling the operating temperature of the lasing medium 14. The method comprises the steps of: selecting the working fluid 44; selecting an operating pressure for the working fluid 44; using the wick 76 to distribute the liquid working fluid 44 at the operating pressure substantially uniformly over the lasing medium surface 80, the working fluid 44 evaporating and removing heat from the lasing medium 14 during contact with the lasing medium surface 80, the vaporized working fluid 44 contacting the condensation surfaces 46, the working fluid 44 transferring heat to the condensation surfaces 46 and condensing on the condensation surfaces 46; using the coolant circuit 60 to remove heat 50 from the condensation surfaces 46; using the wick 76 to capture the condensing working fluid 44; and using the wick 76 to return the liquid working fluid 44 to the lasing medium 14 for redistribution over the lasing medium surface 80. Accordingly, the temperature of the lasing medium surface 80 is substantially equal to the boiling temperature of the working fluid 44 at the operating pressure.

Preferably, the method of controlling the operating temperature of the lasing medium 14 further comprises the steps of: determining the optimum operating temperature for the lasing medium 14; and using the optimum operating temperature for the lasing medium 14 to select the working fluid 44 and the operating pressure for the working fluid 44 so that the working fluid 44 at the operating pressure has a boiling temperature substantially equal to the optimum operating temperature for the lasing medium 14. In doing so, the temperature of the lasing medium surface 80 is chosen to maintain the optimum operating temperature for the lasing medium 14.

Accordingly, the present invention removes large quantities of heat from the lasing medium 14 and optionally from the housing end walls 32 and 34 and seal glands 40 and 42, while inducing little to no vibration or other mechanical disturbance into the lasing medium 14. Moreover, the present invention also removes heat from the lasing medium surface 80 substantially uniformly, which eliminates or at least reduces the thermal stresses and distortions in the lasing medium 14. The present invention is relatively simple to install and maintain, which further enhances system reliability and efficiency.

In addition, reducing overall costs and improving efficiency of solid-state lasers might also be achieved with the present invention. For example, by removing more waste heat from the lasing medium 14 and more accurately controlling the temperature of the outer surface 80 of the lasing medium 14, the present invention reduces the number of diodes that would otherwise be needed to produce a given light output.

In addition, temperature control of the cooling circuit 60 is not critical in the apparatus 10 as it is with currently existing methods wherein the coolant temperature must be controlled to within ±2° F. In the present invention, however, the temperature of the coolant 62 need only be maintained between several degrees less than the boiling temperature of the working fluid 44 at the operating pressure and several degrees above the solidification temperature of the working fluid 44 at the operating pressure. Thus, overall system efficiency is increased because the present invention requires less coolant at a less precisely controlled temperature than that which has heretofore been observed with currently existing methods and devices for removing waste heat from a lasing medium.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. Apparatus for removing heat from a lasing medium of a solid-state laser assembly, comprising:
   a working fluid;
   a housing for supporting the lasing medium; and
   a wick associated with the housing, the wick being disposed adjacent the lasing medium and in contact with the working fluid for distributing the working fluid to contact at least a portion of the lasing medium to thereby absorb heat generated by the lasing medium.

2. The apparatus of claim 1, wherein the housing comprises at least one condensation surface adjacent the wick, and wherein the working fluid evaporates into a heated vapor during contact with the lasing medium, the heated vapor condensing and forming condensation on the at least one condensation surface.

3. The apparatus of claim 2, wherein the condensation is absorbed by the wick and thereafter used to form an additional quantity of the working fluid.

4. The apparatus of claim 2, further comprising at least one fin extending inwardly from the housing, the at least one fin defining the at least one condensation surface.

5. The apparatus of claim 1, wherein at least a portion of the wick is substantially tubular and disposed substantially around the at least a portion of the outer surface of the lasing medium to distribute the working fluid substantially uniformly over the at least a portion of the outer surface of the lasing medium.

6. The apparatus of claim 1, wherein at least a portion of the wick is disposed adjacent at least one component of the housing to distribute the working fluid over at least a portion of the at least one component of the housing.

7. The apparatus of claim 6, wherein the at least one component of the housing comprises at least one end wall of the housing.

8. The apparatus of claim 6, wherein the at least one component of the housing comprises at least one seal gland.

9. The apparatus of claim 1, wherein the lasing medium comprises an end-pumped lasing rod.

10. The apparatus of claim 1, wherein the working fluid comprises a fluid that at substantially atmospheric pressure has a boiling temperature substantially equal to the optimum operating temperature of the lasing medium.

11. A solid-state laser assembly, comprising:
    a lasing medium having an outer surface;
    a housing disposed substantially around at least a portion of the lasing medium, the housing defining at least one condensation surface;
    a working fluid;
    a wick disposed to distribute the working fluid in a liquid state over at least a portion of the outer surface of the lasing medium and to absorb condensation forming on the at least one condensation surface; and
    a coolant circuit,
    wherein the wick distributes the working fluid in a liquid state over the at least a portion of the outer surface of the lasing medium, the working fluid evaporates and removes heat from the lasing medium during contact with the at least a portion of the outer surface of the lasing medium, the working fluid in a vapor state contacts the at least one condensation surface, the working fluid transfers heat to the at least one condensation surface and condenses on the at the least one condensation surface, the wick captures and returns the condensing working fluid substantially by capillary action to the lasing medium for redistribution over the at least a portion of the outer surface of the lasing medium, and heat is transferred to the coolant circuit from the at least one condensation surface.

12. The solid-state laser assembly of claim 11, wherein at least a portion of the wick is disposed adjacent at least one component of the housing to distribute the working fluid over at least a portion of the at least one component of the housing.

13. The solid-state laser assembly of claim 11, wherein the lasing medium comprises an end-pumped lasing rod.

14. A method for removing heat from a lasing medium of a solid-state laser assembly, comprising:
    providing a cooling fluid; and
    using a wick disposed adjacent to the lasing medium, and in contact with the cooling fluid, to wet the lasing medium with the cooling fluid to thereby help to cool the lasing medium.

15. The method of claim 14, further comprising:
    using at least one condensation surface of a housing supporting the lasing medium to capture heated vapor created as the cooling fluid vaporizes during contact with the lasing medium, the at least one condensation surface being disposed adjacent the lasing medium;
    disposing the wick adjacent the at least one condensation surface; and
    using the wick to capture fluid forming on the at least one condensation surface.

16. The method of claim 15, further comprising using the fluid to form a portion of the cooling fluid.

17. The method of claim 14, further comprising:
    disposing the wick adjacent at least one component of a housing supporting the laser medium; and
    using the wick to wet the at least one component of the housing with the cooling fluid to thereby help to cool the housing.

18. A method of controlling the operating temperature of a lasing medium of a solid-state laser assembly, comprising:
    selecting a working fluid;
    selecting an operating pressure for the working fluid;
    distributing the working fluid in a liquid state at the operating pressure substantially uniformly over at least a portion of the outer surface of the lasing medium, the working fluid evaporating and removing heat from the lasing medium during contact with the at least a portion of the outer surface of the lasing medium, the working fluid in a vapor state contacting at least one condensation surface, the working fluid transferring heat to the at least one condensation surface and condensing on the at the least one condensation surface;
    removing heat from the at least one condensation surface; and
    capturing and returning the condensing working fluid to the lasing medium for redistribution over the at least a portion of the outer surface of the lasing medium,
    wherein the temperature of the at least a portion of the outer surface of the lasing medium is substantially equal to the boiling temperature of the working fluid at the operating pressure.

19. The method of claim 18, wherein:
    distributing the working fluid in a liquid state at the operating pressure substantially uniformly over at least a portion of the outer surface of the lasing medium comprises using a wick; and
    capturing and returning the condensing working fluid to the lasing medium for redistribution over the at least a portion of the outer surface of the lasing medium comprises using the wick.

20. The method of claim 18, wherein removing heat from the at least one condensation surface comprises using a coolant circuit.

21. The method of claim 18, further comprising:

determining the optimum operating temperature for the lasing medium; and using the optimum operating temperature for the lasing medium to select the working fluid and the operating pressure so that the working fluid at the operating pressure has a boiling temperature substantially equal to the optimum operating temperature for the lasing medium.

* * * * *